United States Patent
Takahashi et al.

(10) Patent No.: US 12,094,217 B2
(45) Date of Patent: Sep. 17, 2024

(54) IN-VEHICLE SENSOR SYSTEM, AND DATA GENERATION METHOD FOR IN-VEHICLE SENSOR SYSTEM

(71) Applicant: TOYOTA JIDOSHA KABUSHIKI KAISHA, Toyota (JP)

(72) Inventors: Takenoshin Takahashi, Okazaki (JP); Tomoyasu Tamaoki, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 359 days.

(21) Appl. No.: 17/565,520

(22) Filed: Dec. 30, 2021

(65) Prior Publication Data

US 2022/0262125 A1    Aug. 18, 2022

(30) Foreign Application Priority Data

Feb. 18, 2021 (JP) .................................. 2021-23921

(51) Int. Cl.
G06K 9/00    (2022.01)
B60W 50/10    (2012.01)
G06V 20/58    (2022.01)

(52) U.S. Cl.
CPC ............ *G06V 20/58* (2022.01); *B60W 50/10* (2013.01); *B60W 2420/408* (2024.01); *B60W 2422/00* (2013.01)

(58) Field of Classification Search
CPC ........................... G06V 20/58; B60W 2422/00
See application file for complete search history.

(56) References Cited

U.S. PATENT DOCUMENTS

2010/0188507 A1* 7/2010 Kageyama ........... G06V 20/588
                                                                 348/148
2013/0222607 A1    8/2013 Oshima et al.
(Continued)

FOREIGN PATENT DOCUMENTS

CN    105376564 A  *  3/2016  ........... H04N 17/002
CN    110386083 A  * 10/2019  ........... B60Q 1/0023
(Continued)

OTHER PUBLICATIONS

Detection of Vehicle Position and Speed using Camera Calibration and Image Projection Methods, Alexander A S Gunawan et al., Elsevier, 2019, pp. 255-265 (Year: 2019).*

*Primary Examiner* — Jayesh A Patel
(74) *Attorney, Agent, or Firm* — Dickinson Wright, PLLC (57) ABSTRACT

Provided is an in-vehicle sensor system capable of maintaining an equivalent level of precision (accuracy) of data to be output before and after replacement of a surrounding sensor. An in-vehicle sensor system (1) includes: a surrounding sensor including: a casing (11) removably mounted to a bracket (BC) fixed to a vehicle body (B) of a vehicle; a detector which is supported by the casing (11), and is configured to output detection data representing a situation within a predetermined detection range; and a first storage having stored therein first data corresponding to a deviation amount of an actual position and an actual posture of the detector with respect to the casing (11) from a predetermined normal design position and a predetermined normal design posture of the detector with respect to the casing (11); a second storage which is provided separately from the surrounding sensor and is fixed to the vehicle body (B), and is configured to store second data corresponding to a deviation amount of an actual position and an actual posture of the casing (11) with respect to the vehicle body (B) from a predetermined normal design position and a predetermined (Continued)

normal design posture of the casing (11) with respect to the vehicle body (B); and a corrector which is provided on an inner side or an outer side of the casing (11), and is configured to correct, when the second data is stored in the second storage, the detection data output from the detector based on the first data and the second data, to thereby generate and output data expected to be output by the detector when it is assumed that the detector is fixed at the normal design position and in the normal design posture.

6 Claims, 9 Drawing Sheets

(56) References Cited

U.S. PATENT DOCUMENTS

| | | | | |
|---|---|---|---|---|
| 2020/0124447 A1 * | 4/2020 | Schwindt | .............. | G01S 15/931 |
| 2020/0265242 A1 * | 8/2020 | Funahara | ................ | G06V 20/56 |
| 2020/0331471 A1 * | 10/2020 | Takahashi | ......... | B60W 60/0015 |

FOREIGN PATENT DOCUMENTS

| | | | | | |
|---|---|---|---|---|---|
| EP | 3594063 A1 | * | 1/2020 | ............... | B60R 1/00 |
| JP | 2005114683 A | * | 4/2005 | | |
| JP | 2006074329 A | | 3/2006 | | |
| JP | 2020131818 A | * | 8/2020 | ........... | B60R 16/023 |
| TW | 202023863 A | * | 7/2020 | ............. | B60R 11/00 |
| WO | WO-2005010825 A2 | * | 2/2005 | ......... | G01B 11/2513 |
| WO | WO-2015194124 A1 | * | 12/2015 | ............... | B60R 1/00 |

\* cited by examiner

IN-VEHICLE SENSOR SYSTEM, AND DATA GENERATION METHOD FOR IN-VEHICLE SENSOR SYSTEM

RELATED APPLICATION

This application claims priority to Japanese Patent Application No. 2021-23921, filed on Feb. 18, 2021, including the specification, drawings and abstract, the entire disclosure of which is incorporated herein by reference.

BACKGROUND OF THE INVENTION

1. Field of the Invention

The present invention relates to an in-vehicle sensor system for outputting detection data representing a situation within a detection range around a vehicle, for example, a target object and lane markings around the vehicle, and a data generation method to be applied to an in-vehicle sensor system.

2. Description of the Related Art

Hitherto, there has been known an in-vehicle sensor system (hereinafter referred to as "related-art apparatus") for detecting a target object around an own vehicle, and outputting data representing results of the detection (see Japanese Patent Application Laid-open No. 2020-131818). The data output from the in-vehicle sensor system is supplied to a driving assistance apparatus of the vehicle. The driving assistance apparatus recognizes a situation around the vehicle (for example, a positional relationship between the vehicle and the target object) based on the data supplied from the in-vehicle sensor system and executes driving assistance in accordance with results of the recognition.

The related-art apparatus includes a surrounding sensor (for example, a camera sensor). The surrounding sensor is fixed to a predetermined part of a vehicle body. The surrounding sensor includes a detector (for example, an image pickup unit including a lens and an image sensor) and a controller (for example, an image processor). The detector detects a target object within a detection range determined through use of, as a reference, an axis extending in a predetermined direction from a predetermined point (for example, a center portion of the lens) of the surrounding sensor, and outputs detection data (hereinafter referred to as "original data") representing results of the detection.

In general, the driving assistance apparatus (control program for the driving assistance apparatus) is designed based on the premise that the driving assistance apparatus is supplied with data acquired under a state in which a position and a posture of the detector of the surrounding sensor mounted to the vehicle body match a normal position and a normal posture of the detector. Accordingly, in a case in which any one or both of the position and the posture of the detector of the surrounding sensor differ from the normal position and the normal posture, when the detection data of the detector is used as it is, the driving assistance apparatus cannot accurately recognize the situation around the vehicle. In view of the above, the related-art apparatus is configured as described below.

First, at a vehicle production factory, under a state in which the surrounding sensor is fixed to the vehicle, amounts of difference of a current position and a current posture of the surrounding sensor from a normal position and a normal posture of the surrounding sensor are measured through use of a predetermined jig (target board). Then, adjustment values corresponding to results of the measurement are stored in a storage device provided separately from the surrounding sensor. This work is hereinafter referred to as "sensor calibration." After the sensor calibration is ended, the controller corrects the original data based on the adjustment values stored in the storage device, generates data expected to be obtained when the position and the posture of the surrounding sensor match the normal position and the normal posture, and supplies the data to the driving assistance apparatus.

Incidentally, the surrounding sensor is mounted to a bracket fixed to a predetermined part of the vehicle body. The work of mounting the bracket to the vehicle body causes errors of a position and a posture of the bracket. That is, the position and the posture of the bracket on the vehicle body vary depending on each vehicle. Thus, the position and the posture of the surrounding sensor mounted to the bracket also vary depending on each vehicle. Accordingly, when the surrounding sensor is mounted to the bracket during the production of the vehicle, the sensor calibration is always required.

When the surrounding sensor fails and is replaced after the vehicle is shipped from the production factory, a controller of a surrounding sensor after the replacement reads out the adjustment values measured at the time of production of the vehicle and stored in the storage device. Then, the controller corrects the original data based on the read-out adjustment values. As described above, according to the related-art apparatus, when the surrounding sensor is replaced, the sensor calibration is not required to be performed.

The surrounding sensor of the related-art apparatus includes a casing for supporting (accommodating) the detector. This casing is mounted to the bracket. The related-art apparatus is based on the premise that a mounting error of the casing to the bracket is "0". That is, in the related-art apparatus, it is regarded that the position and the posture of the casing before the replacement with respect to the bracket (vehicle body) are substantially the same as the position and the posture of the casing after the replacement with respect to the bracket (vehicle body). In addition, the related-art apparatus is based on the premise that a mounting error of the detector to the casing is "0". That is, it is regarded that "the position and the posture of the detector with respect to the casing of the surrounding sensor before the replacement" are the same as "the position and the posture of the detector with respect to the casing of the surrounding sensor after the replacement." In a case in which the above-mentioned conditions are satisfied, appropriate (effective) data can be obtained when the controller of the surrounding sensor after the replacement corrects the original data based on the adjustment values read out from the storage device.

However, in general, in a step of producing the surrounding sensor, the mounting error of the detector to the casing is caused. That is, in some cases, "the position and the posture of the detector with respect to the casing of the surrounding sensor before the replacement" differ from "the position and the posture of the detector with respect to the casing of the surrounding sensor after the replacement." In those cases, even when the controller of the surrounding sensor after the replacement corrects the original data based on the adjustment values read out from the storage device, appropriate data cannot be obtained. That is, the data obtained through correction of the original data contains an error corresponding to differences between "the position and the posture of the detector with respect to the casing of the surrounding sensor before the replacement" and "the position and the posture of the detector with respect to the casing of the surrounding sensor after the replacement." Thus, there is a fear in that, when the surrounding sensor is replaced, a precision (accuracy) of data (corrected detection data) supplied from this in-vehicle sensor system to the driving assistance apparatus is decreased as compared to a precision (accuracy) of data (corrected detection data) supplied from the surrounding sensor before the replacement to the driving assistance apparatus.

SUMMARY OF THE INVENTION

The present invention has an object to provide an in-vehicle sensor system capable of maintaining an equivalent level of precision (accuracy) of data to be output before and after replacement of a surrounding sensor.

In order to solve the above-mentioned problem, according to at least one embodiment of the present invention, there is provided an in-vehicle sensor system (1) including: a surrounding sensor (10) including: a casing (11) removably mounted to a bracket (BC) fixed to a vehicle body (B) of a vehicle; a detector (12) which is supported by the casing, and is configured to output detection data representing a situation within a detection range determined through use of, as a reference, an axis extending from a predetermined point of the detector; and a first storage (14) having stored therein first data (E1) corresponding to a deviation amount of an actual position and an actual posture of the detector with respect to the casing from a predetermined normal design position and a predetermined normal design posture of the detector with respect to the casing; a second storage (21) which is provided separately from the surrounding sensor and is fixed to the vehicle body, and is configured to store second data ("E2" and "E1 and E3") corresponding to a deviation amount of an actual position and an actual posture of the casing with respect to the vehicle body from a predetermined normal design position and a predetermined normal design posture of the casing with respect to the vehicle body; and a corrector (13) which is provided on one of an inner side and an outer side of the casing, and is configured to read out, when the second data is stored in the second storage, the first data and the second data from the first storage and the second storage, respectively, and to correct the detection data output from the detector based on the read-out first data and the read-out second data, to thereby generate and output data expected to be output by the detector when it is assumed that the detector is fixed at a predetermined normal design position and in a predetermined normal design posture with respect to the vehicle body.

In the in-vehicle sensor system configured as described above, the second data is determined and stored in the second storage at a vehicle production factory or a vehicle repair and maintenance shop. After that, in some cases, the surrounding sensor of the vehicle fails, and replacement of the surrounding sensor is required. In those cases, a worker removes the failed surrounding sensor from the bracket and mounts a new surrounding sensor to the bracket. That is, in this case, the bracket is not replaced, and is still fixed to the vehicle body. The second storage is also not replaced. As described above, when the surrounding sensor fails, a new surrounding sensor is mounted to the existing (common) bracket, and hence the position and the posture of the casing with respect to the vehicle body (that is, the second data) do not change before and after the replacement of the surrounding sensor. Thus, when the surrounding sensor is replaced, the corrector may read out the second data from the second storage and use the second data for the correction of the detection data without a problem.

Before the surrounding sensor is replaced, the corrector corrects the detection data based on the first data specific to the surrounding sensor before the replacement and on the second data independent of the individual surrounding sensor (that is, common to the surrounding sensors before and after the replacement). After the surrounding sensor is replaced, the corrector corrects the detection data based on the first data specific to the surrounding sensor after the replacement and on the second data independent of the individual surrounding sensor. That is, the first data specific to the current surrounding sensor is always reflected in the correction result of the detection data. Thus, according to the at least one embodiment of the present invention, when the surrounding sensor is replaced, without measurement of the position and the posture of the detector of the surrounding sensor after the replacement, it is possible to maintain, at an equivalent level, the precision (accuracy) of the data to be output from the surrounding sensor before the replacement and the precision (accuracy) of the data to be output from the surrounding sensor after the replacement.

In the in-vehicle sensor system according to one aspect of the present invention, the second storage is configured to store, as the second data, data directly representing the deviation amount of the actual position and the actual posture of the casing with respect to the vehicle body from the predetermined normal design position and the predetermined normal design posture of the casing with respect to the vehicle body.

With this configuration, after the surrounding sensor is replaced, the corrector is not required to perform calculation for obtaining the deviation amount of the casing. That is, the corrector can correct the detection data through direct use of the first data and the second data.

In the in-vehicle sensor system according to another aspect of the present invention, the second storage is configured to store, as the second data, data of a combination of: third data directly representing a deviation amount of an actual position and an actual posture of the detector with respect to the vehicle body from a predetermined normal design position and a predetermined normal design posture of the detector with respect to the vehicle body; and first data directly representing the deviation amount of the actual position and the actual posture of the detector with respect to the casing from the predetermined normal design position and the predetermined normal design posture of the detector with respect to the casing, in a case in which the third data is obtained.

With this configuration, the work of storing the second data into the second storage is simplified as compared to a case in which the deviation amount of the actual position and the actual posture of the casing with respect to the vehicle body from the predetermined normal design position and the predetermined normal design posture of the casing with respect to the vehicle body is calculated based on the first data and the third data, and a result of the calculation is stored in the second storage as the second data.

In the in-vehicle sensor system according to still another aspect of the present invention, the second storage is an area of a part of a storage area of a storage device included in an in-vehicle component which is provided separately from the surrounding sensor.

With this configuration, as compared to a case in which the second storage is provided as a dedicated component, the number of components as the whole vehicle can be reduced.

The present invention also encompasses a detection data generation method to be applied to an in-vehicle sensor system.

In the description given above, in order to facilitate understanding of the present invention, reference symbols in parentheses used in at least one embodiment of the present invention described later are added to components of the invention corresponding to the at least one embodiment. However, respective components of the present invention are not limited to the at least one embodiment prescribed by the reference symbols. Other objects, other features, and accompanying advantages of the present invention can be readily understood from a description of the at least one embodiment of the present invention provided referring to the accompanying drawings.

DESCRIPTION OF THE EMBODIMENTS

Outline

Figure 1:
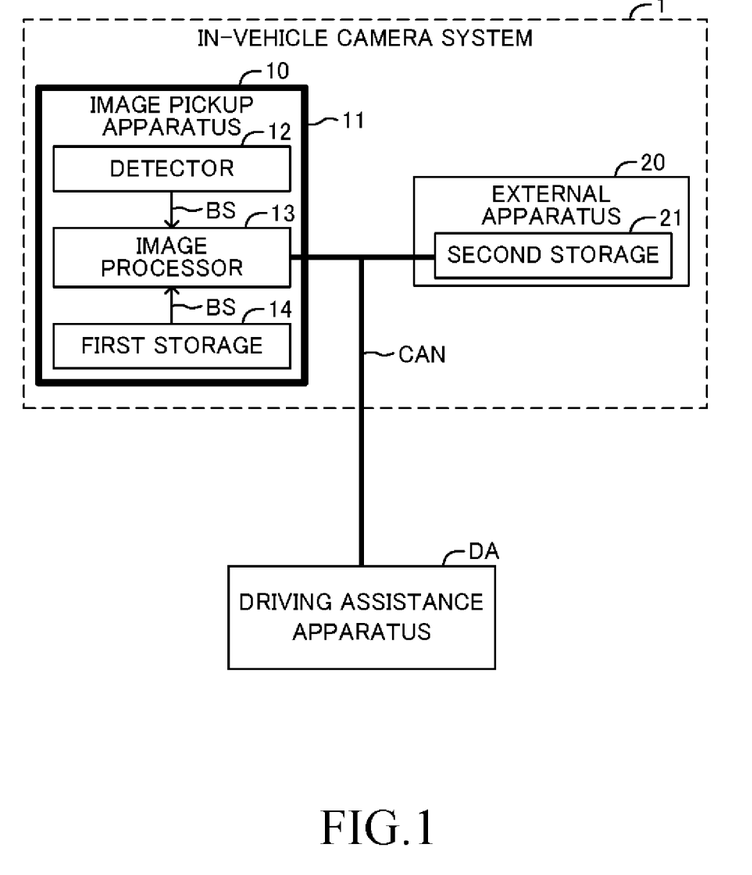
FIG. 1 is a block diagram of an in-vehicle camera system according to at least one embodiment of the present invention.

An in-vehicle camera system (in-vehicle sensor system) 1 according to at least one embodiment of the present invention includes, as illustrated in FIG. 1, an image pickup apparatus 10 and an external apparatus 20. The in-vehicle camera system 1 is connected to a driving assistance apparatus DA via a network CAN. As described later, the in-vehicle camera system 1 corrects image data representing an image obtained by photographing a front view of a vehicle, and supplies the corrected image data to the driving assistance apparatus DA via the network CAN. The driving assistance apparatus DA executes various types of driving assistance based on the image data supplied from the in-vehicle camera system 1.

(Configuration)

The image pickup apparatus (camera unit) 10 includes a casing (case main body) 11, a detector (image pickup unit) 12, an image processor (data processing device) 13, and a first storage (memory) 14.

Figure 2A:
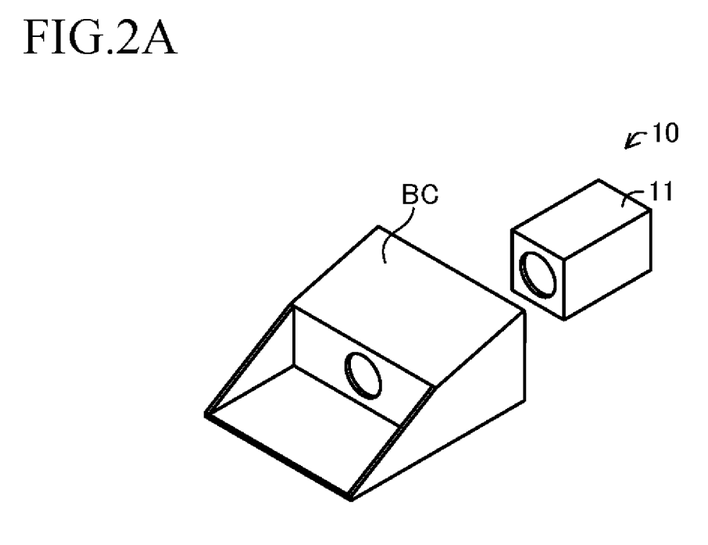
FIG. 2A is an exploded perspective view of a bracket and an image pickup apparatus as viewed from diagonally forward.
Figure 2B:
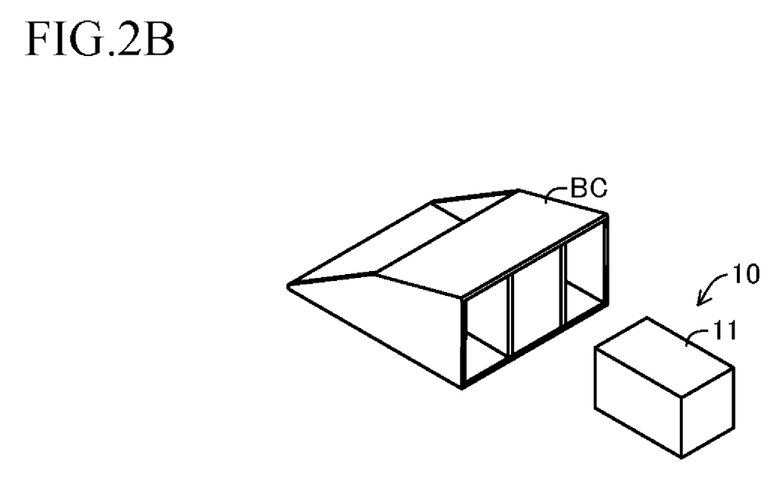
FIG. 2B is an exploded perspective view of the bracket and the image pickup apparatus as viewed from diagonally rearward.
Figure 9:
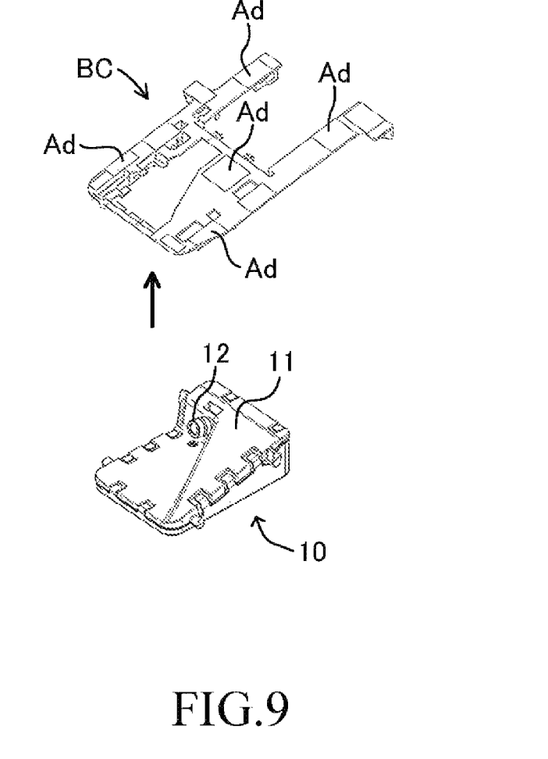
FIG. 9 is a perspective view for illustrating an image pickup apparatus and a bracket in another modification example of the present invention.

The casing 11 is, as illustrated in FIG. 2A and FIG. 2B, a box member having a substantially cuboid shape. The detector 12, the image processor 13, and the first storage 14 are held (accommodated or fixed) by the casing 11. As described later, the casing 11 may be shaped as illustrated in FIG. 9.

Figure 3:
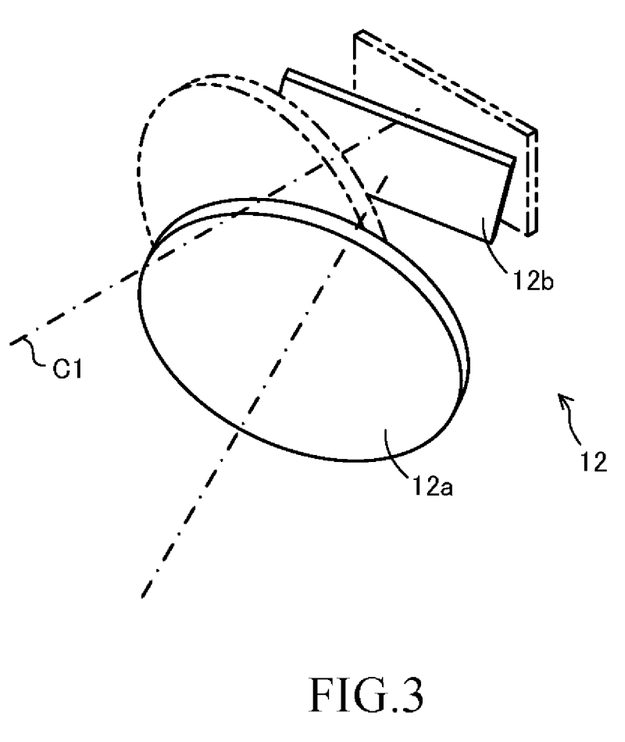
FIG. 3 is a perspective view for illustrating a first error.

The detector 12 is a monocular camera. As illustrated in FIG. 3, the detector 12 includes a lens 12a and an image sensor 12b. The detector 12 guides, to the image sensor 12b through the lens 12a, light from a target object and a background within a predetermined range having an optical axis (center axis) C1 of the lens 12a as a center axis and converts the light into image data by the image sensor 12b. That is, the detector 12 photographs a target object and a landscape within a predetermined range, and supplies image data representing an image obtained by the photographing to the image processor 13. This image data is not subjected to correction (position and posture correction) to be described later, and is thus sometimes referred to as "original image data" for the sake of convenience.

Referring back to FIG. 1, the image processor 13 includes a microcomputer including a CPU, a ROM, a RAM, a communication interface, and the like. The CPU of the image processor 13 subjects the original image data supplied from the detector 12 to correction (position and posture correction) processing based on "a first error E1 and a second error E2" to be described later, to thereby generate corrected image data. The CPU transmits (supplies) the corrected image data to the driving assistance apparatus DA via the network CAN. The first error E1, the second error E2, and a third error E3 are sometimes referred to as "first data," "second data," and "third data," respectively.

The first storage 14 is a device for storing the first error E1 to be described later, and includes a rewritable nonvolatile memory (for example, an EEPROM or a one-time programmable ROM). The first storage 14 is connected to the CPU of the image processor 13 via a bus BS.

The external apparatus 20 is an electronic control unit (ECU), and includes a second storage 21. The second storage 21 includes a memory for storing the second error E2 to be described later. This memory is a rewritable nonvolatile memory (for example, an EEPROM). The external apparatus 20 (accordingly, the second storage 21) is connected to the CPU of the image processor 13 and a microcomputer (not shown) of the driving assistance apparatus DA via the network CAN.

Figure 4:
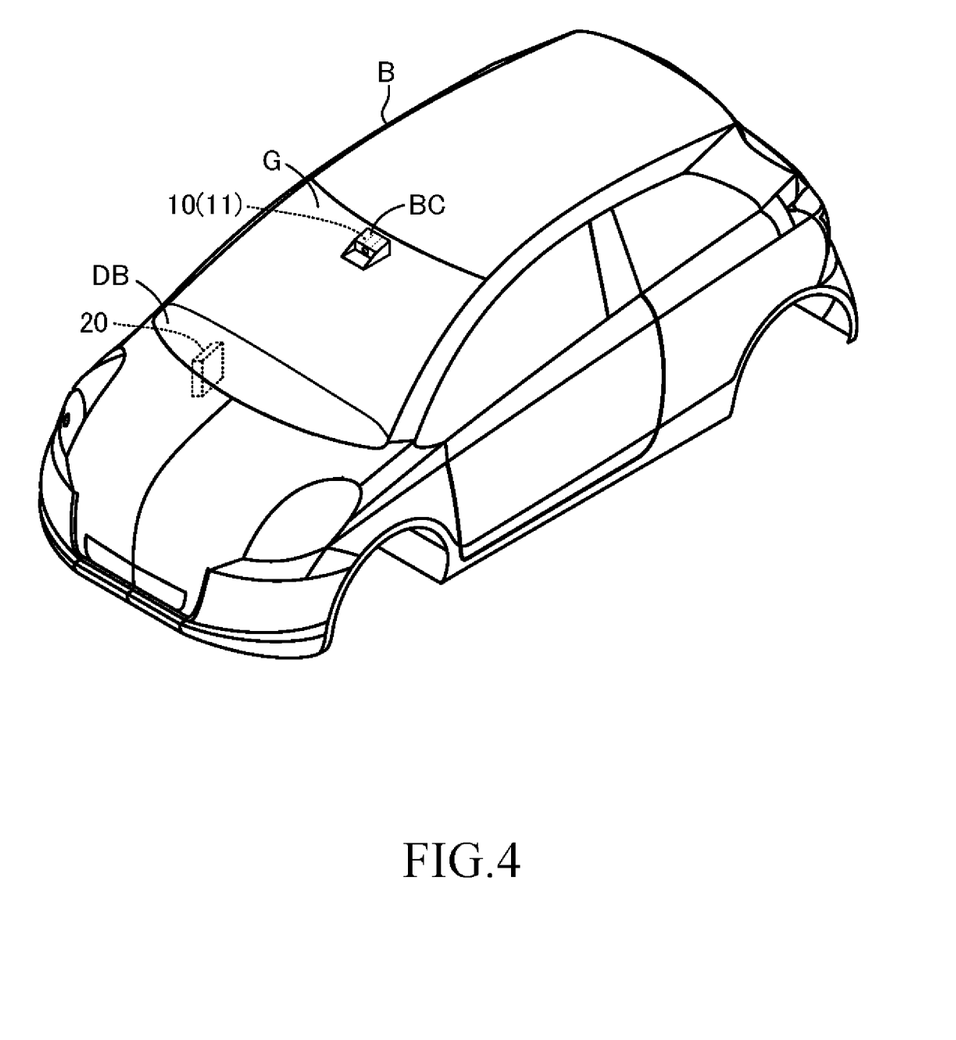
FIG. 4 is a perspective view for illustrating a state in which the bracket is mounted to a vehicle body.

As illustrated in FIG. 4, the image pickup apparatus 10 is fixed to an upper portion of a front windshield glass G of a vehicle body B of a vehicle. Specifically, a bracket BC illustrated in FIG. 2A and FIG. 2B is fixed through adhesion at a predetermined position (center position in a vehicle width direction) on a vehicle cabin inner side of the upper portion of the front windshield glass G (see FIG. 4). As described later, the bracket BC may be shaped as illustrated in FIG. 9. The casing 11 of the image pickup apparatus 10 is fitted to this bracket BC. Accordingly, a mounting error of the casing 11 with respect to the bracket BC does not occur in fact. When the casing 11 is fitted to the bracket BC, "a position and a posture" of the image pickup apparatus 10 (accordingly, the detector 12) with respect to the vehicle body B are determined. The position of the detector 12 with respect to the vehicle body B includes a position of the detector 12 in the vehicle width direction, a position of the detector 12 in a height direction, and a position of the detector 12 in a longitudinal direction of the vehicle body B. The posture of the detector 12 with respect to the vehicle body B includes "a pan angle, a tilt angle, and a roll angle" of the detector 12 with respect to the vehicle body B.

The external apparatus 20 (accordingly, the second storage 21) is fixed with respect to the vehicle body B in a dashboard DB of the vehicle body B (see FIG. 4). The external apparatus 20 is connected to the image pickup apparatus 10 and the driving assistance apparatus DA by a communication cable (not shown).

Figure 5A:
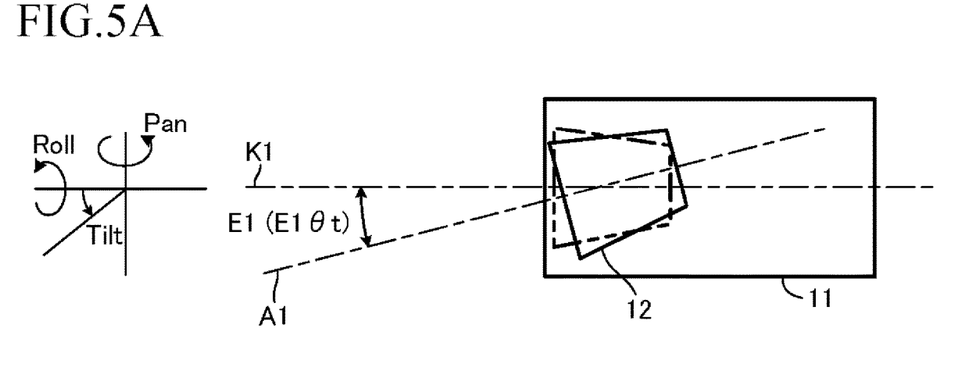
FIG. 5A is a side view for illustrating the first error.

Incidentally, the detector 12 is manufactured separately from the casing 11. At a production factory (assembly factory) of the image pickup apparatus 10, the detector 12 is mounted (fixed) to the casing 11. At this time, a mounting error of the detector 12 to the casing 11 is caused. That is, as illustrated in FIG. 3 and FIG. 5A, in some cases, "an actual position and an actual posture (see the solid lines of FIG. 3 and FIG. 5A)" of the detector 12 with respect to the casing 11 differ from "a normal (design) position and a normal (design) posture (see the long-dashed double-short dashed lines of FIG. 3 and FIG. 5A)" of the detector 12 with respect to the casing 11.

In view of the above, at the production factory of the image pickup apparatus 10, the mounting error of the detector 12 to the casing 11 is measured through use of a well-known measurement method. This mounting error is a deviation amount of "the actual position and the actual posture" of the detector 12 with respect to the casing 11 from "the normal position and the normal posture" of the detector 12 with respect to the casing 11, and is hereinafter referred to as "first error E1." In the figures including FIG. 3 in which the position and the posture of the detector 12 are drawn, errors including the first error E1 are drawn in a relatively large scale (in an emphasized manner), but actual errors are minute.

The first error E1 includes, as listed below, an error of the position of the detector 12 with respect to the casing 11, and an error of the posture of the detector 12 with respect to the casing 11.

<Error of Position of Detector 12 with Respect to Casing 11>

When it is assumed that the casing 11 is mounted at a normal position and in a normal posture with respect to the vehicle body B, the following deviation amounts are caused from the normal position of the detector 12 with respect to the casing 11:
- a deviation amount (E1$dw$) of the actual position in the vehicle width direction of the detector 12 with respect to the casing 11;
- a deviation amount (E1$dh$) of the actual position in the vehicle height direction of the detector 12 with respect to the casing 11; and
- a deviation amount (E1$df$) of the actual position in the vehicle longitudinal direction of the detector 12 with respect to the casing 11.

<Error of Posture of Detector 12 with Respect to Casing 11>

When it is assumed that the casing 11 is mounted at a normal position and in a normal posture with respect to the vehicle body B, the following deviation amounts are caused from the normal posture of the detector 12 with respect to the casing 11:
- a deviation amount (E1$\theta p$) of a pan angle of the detector 12 with respect to the casing 11;
- a deviation amount (E1$\theta t$) of a tilt angle of the detector 12 with respect to the casing 11; and
- a deviation amount (E1$\theta r$) of a roll angle of the detector 12 with respect to the casing 11.

That is, it can be said that the first error E1 is a vector including E1$dw$, E1$dh$, E1$df$, E1$\theta p$, E1$\theta t$, and E1$\theta r$ as elements.

Now, in order to simplify the description, it is assumed that, as illustrated in FIG. 5A, among the elements of the first error E1, only "the deviation amount (E1$\theta t$) of the tilt angle, which is one error of the posture of the detector 12 with respect to the casing 11 (casing longitudinal reference line K1)" has a value other than "0". That is, it is assumed that "other elements of the first error E1" other than E1$\theta t$ are "0". At the production factory, the first error E1 (in this example, E1$\theta t$) is written into the first storage 14. The work of measuring the first error E1 and writing the first error E1 into the first storage 14 is performed by a worker operating a jig (for example, a target board or a computer apparatus). The image processor 13 may have a function of automatically executing part of the work.

Figure 5B:
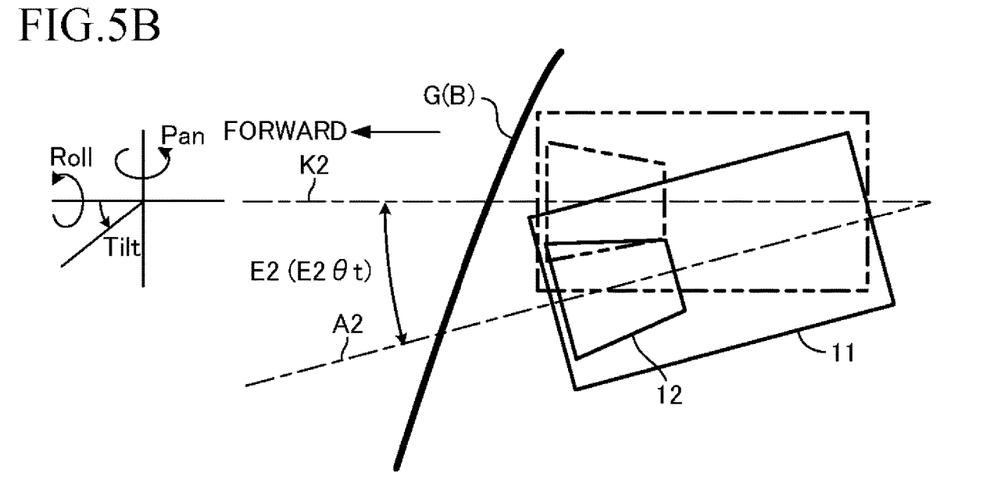
FIG. 5B is a side view for illustrating a second error.
Figure 6:
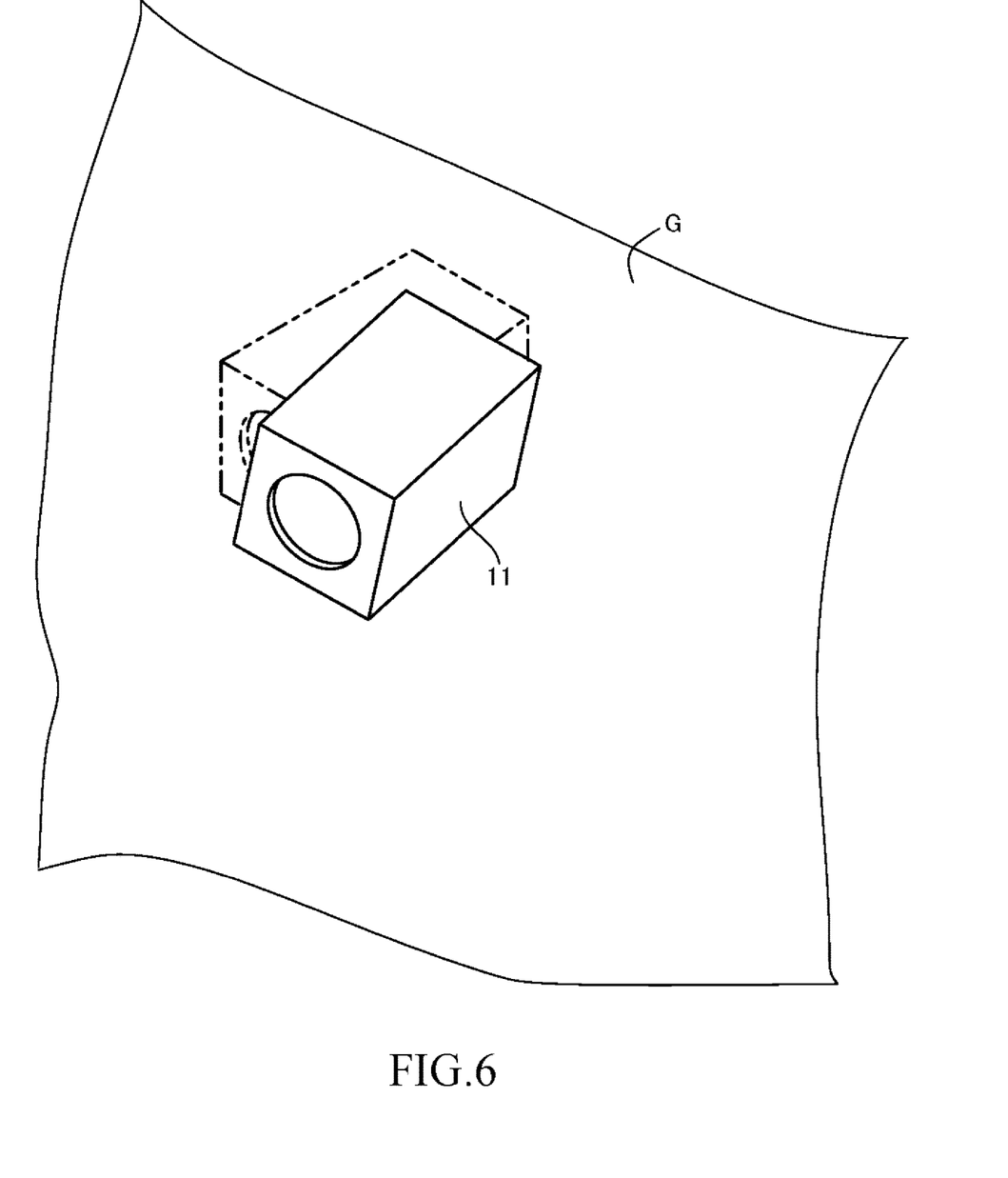
FIG. 6 is a perspective view for illustrating a position and a posture of a detector mounted to the vehicle body.

In addition, when the bracket BC is mounted to the vehicle body B (in an actual case, to the front windshield glass G), a mounting error of the bracket BC to the vehicle body B is caused. Thus, as indicated by the solid lines of FIG. 5B and FIG. 6, when the casing 11 is fixed to the bracket BC, even in a case in which there is no first error E1 described above, in some cases, "an actual position and an actual posture" of the detector 12 with respect to the vehicle body B deviate from "a normal position and a normal posture" of the detector 12 with respect to the vehicle body B. In FIG. 5B and FIG. 6, the casing 11 fixed to the vehicle body B at "the normal position and in the normal posture" is indicated by the long-dashed double-short-dashed lines.

A deviation amount of "the actual position and the actual posture" of the detector 12 with respect to the vehicle body B from "the normal position and the normal posture" of the detector 12 with respect to the vehicle body B in a case in which the image pickup apparatus 10 having no first error E1 is fixed to the vehicle body B by the bracket BC is referred to as "second error E2." The second error E2 is an amount representing the mounting error of the bracket BC to the vehicle body B (front windshield glass G), and can be also said as an amount representing a mounting error of the casing 11 with respect to the vehicle body B. The second error E2 includes, as listed below, an error of the position of the casing 11 with respect to the vehicle body B, and an error of the posture of the casing 11 with respect to the vehicle body B.

<Error of Position of Casing 11 with Respect to Vehicle Body B>

The following deviation amounts are caused from the normal position of the casing 11 with respect to the vehicle body B:
- a deviation amount (E2$dw$) of the actual position in the vehicle width direction of the casing 11;
- a deviation amount (E2$dh$) of the actual position in the vehicle height direction of the casing 11; and
- a deviation amount (E2$df$) of the actual position in the vehicle longitudinal direction of the casing 11.

<Error of Posture of Casing 11 with Respect to Vehicle Body B>

The following deviation amounts are caused from the normal posture of the casing 11 with respect to the vehicle body B:
- a deviation amount (E2$\theta p$) of an actual pan angle of the casing 11;
- a deviation amount (E2$\theta t$) of an actual tilt angle of the casing 11; and
- a deviation amount (E2$\theta r$) of an actual roll angle of the casing 11.

That is, it can be said that the second error E2 is a vector including E2$dw$, E2$dh$, E2$df$, E2$\theta p$, E2$\theta t$, and E2$\theta r$ as elements.

Now, in order to simplify the description, it is assumed that, as illustrated in FIG. 5B, among the elements of the second error E2, only "the deviation amount (E2$\theta t$) of the tilt angle, which is one error of the posture of the casing 11 with respect to the vehicle body B (vehicle body longitudinal reference line K2)" has a value other than "0". That is, it is assumed that "other elements of the second error E2" other than E2θ$t$ are "0".

Figure 5C:
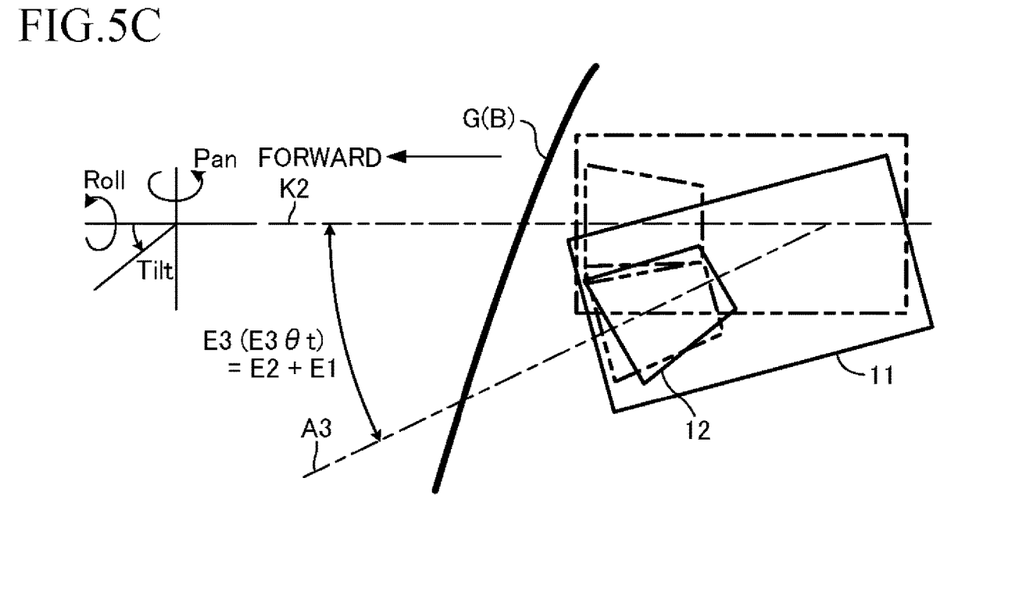
FIG. 5C is a side view for illustrating a third error.

Incidentally, in an actual case, the image pickup apparatus 10 (that is, the casing 11) having the first error E1 (E1θt) illustrated in FIG. 5A is fixed to the bracket BC. As a result, as illustrated in FIG. 5C, a deviation amount of "the actual position and the actual posture" of the detector 12 with respect to the vehicle body B from "the normal position and the normal posture" of the detector 12 with respect to the vehicle body B is an amount including the first error E1 and the second error E2 (hereinafter referred to as "third error E3" for the sake of convenience). That is, for example, the deviation amount (E3θt) of the tilt angle of the third error E3 is obtained as a sum of the deviation amount (E1θt) of the tilt angle of the first error E1 and the deviation amount (E2θ$t$) of the tilt angle of the second error E2. In other words, when the third error E3 is measured, the first error E1 is already written in the first storage 14, and hence the second error E2 (that is, the amount representing the mounting error of the bracket BC to the vehicle body B) can be obtained from the third error E3 and the first error E1.

The third error E3 includes, as listed below, an error of the position of the detector 12 with respect to the vehicle body B, and an error of the posture of the detector 12 with respect to the vehicle body B.

<Error of Position of Detector 12 with Respect to Vehicle Body B>

The following deviation amounts are caused from the normal position of the detector 12 with respect to the vehicle body B:

- a deviation amount (E3$dw$) of the actual position in the vehicle width direction of the detector 12;
- a deviation amount (E3$dh$) of the actual position in the vehicle height direction of the detector 12; and
- a deviation amount (E3$df$) of the actual position in the vehicle longitudinal direction of the detector 12.

<Error of Posture of Detector 12 with Respect to Vehicle Body B>

The following deviation amounts are caused from the normal posture of the detector 12 with respect to the vehicle body B:

- a deviation amount (E3θ$p$) of the actual pan angle of the detector 12;
- a deviation amount (E3θ$t$) of the actual tilt angle of the detector 12; and
- a deviation amount (E3θ$r$) of the actual roll angle of the detector 12.

That is, it can be said that the third error E3 is a vector including E3$dw$, E3$dh$, E3$df$, E3θ$p$, E3θ$t$, and E3θ$r$ as elements.

The third error E3 (E3θ$t$ of FIG. 5C) is measured by a well-known method at the vehicle production factory including a step of mounting the casing 11 to the bracket BC fixed to the vehicle body B. For example, a target board is arranged with high precision at a predetermined specific position ahead of the vehicle, and this target board is photographed by "the image pickup apparatus 10 fixed to the vehicle" so that the original image data is acquired. Next, this original image data is compared with standard image data so that the third error E3 is calculated. The standard image data is image data obtained when the image pickup apparatus 10 in a state in which "the position and the posture" with respect to the vehicle body B are normal photographs the target board arranged at the above-mentioned specific position, and is prepared in advance. Those steps of processing are executed through use of a dedicated measurement apparatus (computer) connected to the image pickup apparatus 10 fixed to the vehicle.

Next, the measurement apparatus reads the first error E1 from the first storage 14 of the image pickup apparatus 10 fixed to the vehicle, and obtains the second error E2 through calculation based on this first error E1 and on the third error E3 obtained through measurement and calculation. For example, as can be inferred from the fact that E2θ$t$ can be obtained by subtracting E1θt from E3θ$t$, basically, when the first error E1 being a vector is subtracted from the third error E3 being a vector, the second error E2 being a vector can be obtained. Then, the measurement apparatus writes the obtained second error E2 into the second storage 21 of the external apparatus 20.

After the vehicle is shipped, the CPU of the image processor 13 reads out the first error E1 and the second error E2 from the first storage 14 and the second storage 21, respectively. Then, the CPU obtains the third error E3 based on the first error E1 and the second error E2, and corrects the original image data based on the third error E3, to thereby generate the corrected image data (normal image data). That is, the corrected image data is image data expected to be output from the detector 12 under a state in which the third error E3 is "0" (that is, a state in which the position and the posture of the detector 12 on the vehicle body match the normal position and the normal posture). The CPU of the image processor 13 transmits the corrected image data to the microcomputer (not shown) of the driving assistance apparatus DA, and the microcomputer of the driving assistance apparatus DA executes the driving assistance control of each output through use of the corrected image data.

(Operation)

Figure 7:
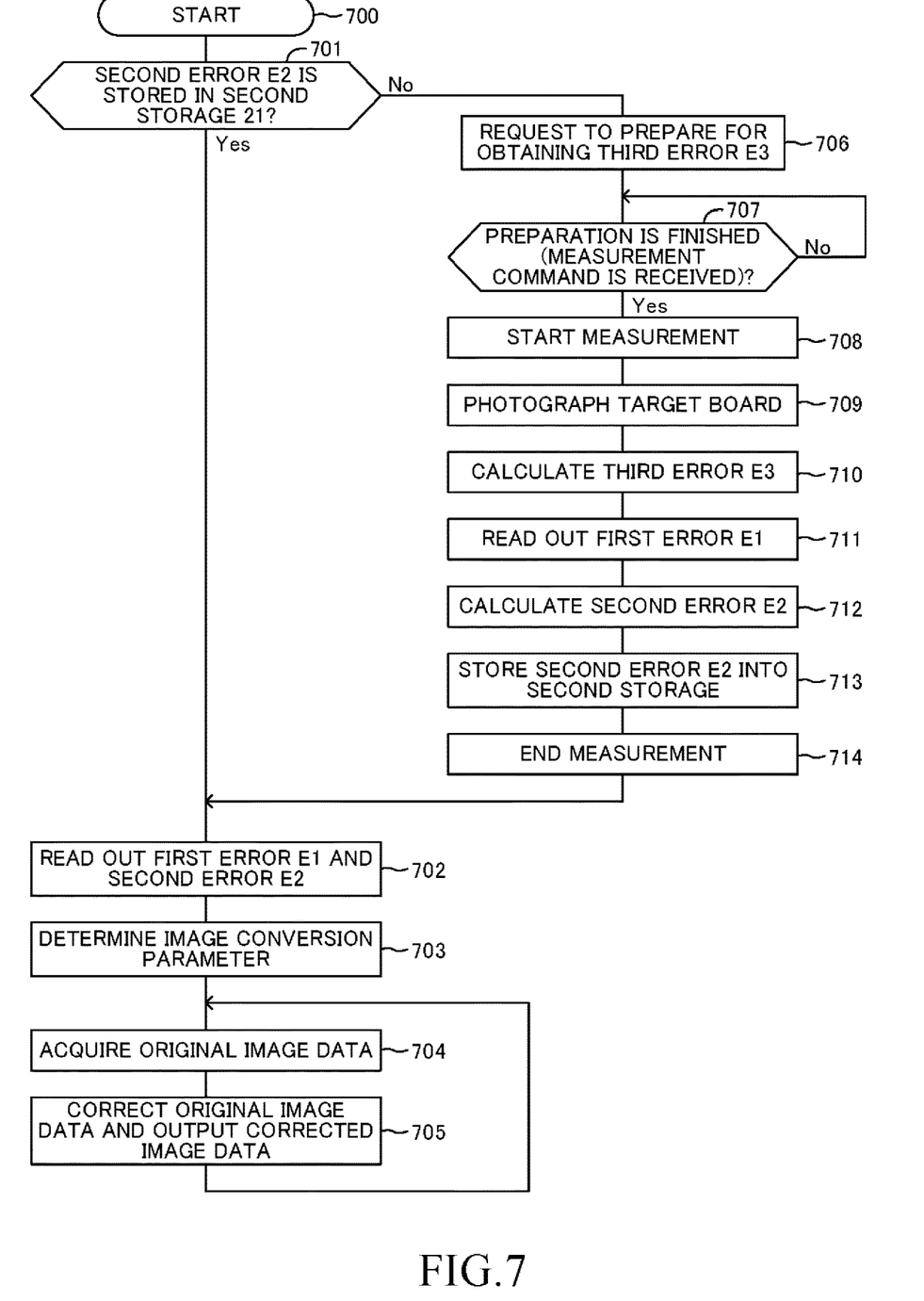
FIG. 7 is a flow chart of an image processing program.

Next, with reference to FIG. 7, an operation of the CPU of the image processor 13 is specifically described.

When an ignition key switch (not shown) is changed from an OFF position to an ON position under a state in which the in-vehicle camera system 1 is installed on the vehicle, the in-vehicle camera system 1 is activated, and the CPU starts execution of the image processing program from Step 700 of FIG. 7.

Next, in Step 701, the CPU determines whether or not the second error E2 is stored in the second storage 21. That is, the CPU determines whether a current time point is not a time point immediately after the image pickup apparatus 10 is fixed to the bracket BC and required electrical connection is established at the vehicle production factory.

When the second error E2 is stored in the second storage 21 (Step 701: Yes), the process proceeds to Step 702, and the CPU reads out the first error E1 and the second error E2 from the first storage 14 and the second storage 21, respectively.

Next, in Step 703, the CPU obtains the third error E3 based on the first error E1 and the second error E2, and determines, based on this third error E3, an image conversion parameter (image conversion matrix component) for converting (correcting) the original image data into the corrected image data.

Next, in Step 704, the CPU acquires the original image data from the detector 12.

Next, in Step 705, the CPU corrects the acquired original image data through use of the image conversion parameter to generate the corrected image data (normal image data), and supplies the corrected image data to the driving assistance ECU.

Then, the CPU repeatedly performs the processing steps of Step 704 and Step 705. Accordingly, the CPU generates the corrected image data every time the original image data is acquired from the detector 12, and supplies the corrected image data to the driving assistance ECU.

On the other hand, when the current time point is a time point immediately after the image pickup apparatus 10 is fixed to the bracket BC and the required electrical connection is established at the vehicle production factory, no second error E2 is stored in the second storage 21. In this case, the CPU determines "No" in Step 701, and sequentially performs processing steps of from Step 706 to Step 714 described below. Then, the process proceeds to Step 702.

Step 706: The CPU causes a display apparatus installed on a predetermined vehicle to display an image for requesting a worker to prepare for obtaining the third error (finally, the second error E2 is obtained through calculation in Step 714 to be described later).

This display apparatus installed on the vehicle is, for example, a liquid crystal display apparatus of a navigation system of the vehicle.

When the worker recognizes that the image is displayed, the worker arranges a target board at a predetermined specific position ahead of the vehicle. A positional relationship between the vehicle and the target board greatly affects a measurement result of the third error E3 (finally, the value of the second error E2). Thus, the work of arranging the target board is required to be performed accurately.

Next, the worker connects a specific computer apparatus (jig) to the network CAN so that a measurement start command representing that the measurement of the third error E3 is to be started is transmitted from the specific computer apparatus to the CPU of the image processor 13.

Step 707: The CPU monitors whether or not the measurement start command has been received. The CPU stands by until the measurement start command is received, and the process proceeds to Step 708 after the measurement start command is received.

Step 708: The CPU starts the processing for obtaining the third error E3, and causes the display apparatus to display an image representing that the measurement is in process.

Step 709: The CPU causes the detector 12 to photograph current image data representing the target board, and acquires the original image data obtained through the photographing.

Step 710: The CPU analyzes the image of the target board represented by the original image data acquired in Step 709 through comparison with the standard image data. That is, the CPU obtains the third error E3 through calculation based on "a position, a posture, a distortion (degree of curvature)," and the like of "a mark drawn on the target board" in the original image data.

Step 711: The CPU reads out the first error E1 from the first storage 14.

Step 712: The CPU obtains the second error E2 through calculation based on the third error E3 obtained in Step 710 and the first error E1 read out in Step 711. For example, the CPU subtracts the first error E1 being a vector from the third error E3 being a vector to obtain the second error E2 (=E3−E1).

Step 713: The CPU transmits the obtained second error E2 to the external apparatus 20 via the network CAN, and stores the second error E2 into the second storage 21.

Step 714: The CPU causes the display apparatus to display an image representing that the acquisition of the second error E2 and the storage of the second error E2 into the second storage 21 are ended. At this time point, the worker disconnects the specific computer apparatus from the network CAN. Then, the process proceeds to Step 702.

The processing steps of from Step 710 to Step 713 may be executed while the specific computer apparatus performs data exchange with the image processor 13.

As described above, at a time point immediately after the in-vehicle camera system 1 is mounted to the vehicle body in the vehicle production step, the second error E2 has not been stored in the second storage 21 yet. Accordingly, the process proceeds from Step 701 to Step 706, and the CPU executes a series of processing steps of from Step 706 to Step 714 to store the second error E2 into the second storage 21.

After the vehicle is shipped from the production factory, when the image pickup apparatus 10 is normal, the CPU executes the processing steps of from Step 701 to Step 703 at the time of activation, and then repeats the processing steps of Step 704 and Step 705.

Meanwhile, after the vehicle is shipped from the production factory, in some cases, the image pickup apparatus 10 fails, and the image pickup apparatus 10 is replaced. In those cases, the worker removes the failed image pickup apparatus 10 from the bracket BC, and fits a new image pickup apparatus 10 to the bracket BC so as to fix the new image pickup apparatus 10 to the vehicle. That is, in this case, the bracket BC is not replaced, and is still fixed to the front windshield glass G. The external apparatus 20 is also not replaced, and is still fixed inside the dashboard DB. As described above, when the image pickup apparatus 10 fails, a new image pickup apparatus 10 is mounted to the bracket BC fixed to the front windshield glass G at the production factory. Thus, "the position and the posture (that is, the second error E2)" of the casing 11 with respect to the vehicle body B do not change before and after the replacement of the image pickup apparatus 10. This second error E2 is measured at the time of production of the vehicle, and is stored in the second storage 21 of the external apparatus 20. Thus, when the image pickup apparatus 10 is replaced, it is not required to obtain the second error E2 again. That is, when the in-vehicle camera system 1 is activated after the image pickup apparatus 10 is replaced, the process directly proceeds from Step 701 to Step 702 instead of proceeding from Step 701 to Step 702 via Step 706 to Step 714.

In Step 702, the CPU reads out, from the first storage 14, the first error E1 specific to the current image pickup apparatus 10 mounted to the bracket BC, and reads out, from the second storage 21, the second error E2 independent of the individual image pickup apparatus 10. Then, in Step 703, the CPU determines the image conversion parameter based on the first error E1 and the second error E2 (that is, the third error E3), and, in Step 705, the CPU corrects the original image data through use of the image conversion parameter.

As is understood from the above, the first error E1 specific to the image pickup apparatus 10 mounted to the vehicle body B at the current time point is reflected in the image conversion parameter. Thus, according to the at least one embodiment, when the image pickup apparatus 10 is replaced, without troublesome work of measuring the position and the posture of the detector 12 of the image pickup apparatus 10 after the replacement, the corrected image data having the same level of precision before and after the replacement of the image pickup apparatus 10 can be transmitted from the image pickup apparatus 10 to the driving assistance apparatus DA.

In the above, the in-vehicle camera system 1 according to the at least one embodiment has been described, but the present invention is not limited to the above-mentioned at least one embodiment, and various changes are possible within the range not departing from the object of the present invention.

Modification Example 1

In the above-mentioned at least one embodiment, the second error E2 is obtained based on the first error E1 and the third error E3, and this second error E2 is stored in the second storage 21. As another example, the first error E1 and the third error E3 may be stored in the second storage 21. In this case, when the image pickup apparatus 10 is replaced, the image pickup apparatus 10 after the replacement reads out, from the second storage 21, "the first error E1 and the third error E3 of the image pickup apparatus 10 before the replacement," and obtains the second error E2 from "the third error E3 and the first error E1." Then, the image pickup apparatus 10 after the replacement obtains the image conversion parameter from the obtained second error E2 and the first error E1 stored in the first storage 14 of the image pickup apparatus 10 after the replacement. This image conversion parameter may be used to correct the original image data of the image pickup apparatus 10 after the replacement to obtain the corrected image data.

Modification Example 2

In the above-mentioned at least one embodiment, the first error E1 is stored in the first storage 14, but in place of the first error E1, a first adjustment value being a value corresponding to the first error E1 and for use to correct the mounting error of the detector 12 to the casing 11 may be stored in the first storage 14. For example, it is preferred that the first adjustment value be determined by a jig (measurement apparatus) for measuring the first error E1 at the time of production of the image pickup apparatus 10, the image processor 13, or the like. In this case, it is preferred that, in place of the second error E2, a second adjustment value being a value corresponding to the second error E2 and for use to correct the mounting error of the bracket BC to the vehicle body be stored in the second storage 21. For example, it is preferred that the second adjustment value be determined by a jig (measurement apparatus) for measuring the second error E2 at the time of production of the vehicle, the image processor 13, or the like. In this case, the CPU of the image processor 13 may correct the original image data based on the first adjustment value and the second adjustment value.

Modification Example 3

Figure 8:
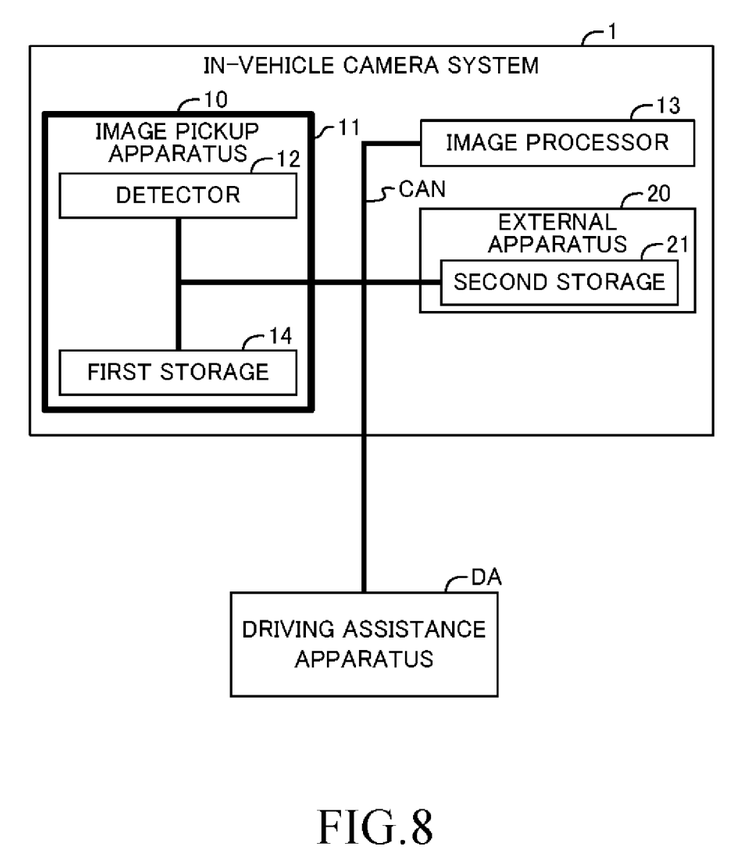
FIG. 8 is a block diagram of an in-vehicle camera system according to a modification example of the present invention.

In the above-mentioned at least one embodiment, the image processor 13 is provided inside of the casing 11, but as another example, as illustrated in FIG. 8, the image processor 13 may be provided outside of the casing 11. That is, in this example, the image processor 13 is connected to the detector 12 and the first storage 14 and to the second storage 21 via the network CAN. The image processor 13 acquires the original image data, the first error E1, and the second error E2 from the detector 12, the first storage 14, and the second storage 21, respectively. Then, the image processor 13 corrects the original image data based on the first error E1 and the second error E2, and supplies the corrected image data to the driving assistance apparatus DA. In this case, the image processor 13 may be incorporated in another apparatus, for example, the external apparatus 20 or the driving assistance apparatus DA.

Modification Example 4

In the above-mentioned at least one embodiment, the second error E2 is stored in the external apparatus 20, but the second error E2 may be stored in a storage device of "the driving assistance apparatus DA, an engine control apparatus, or a brake control apparatus" serving as the external apparatus 20. That is, a part of a storage area of a storage device of another in-vehicle component may be used as the external apparatus 20. In this case, it is preferred that the another in-vehicle component be a component that has a low possibility of replacement.

Modification Example 5

The present invention is also applicable to another surrounding monitoring sensor system other than the in-vehicle camera system 1. For example, the present invention is also applicable to a radar sensor system. The radar sensor system includes a radar apparatus and an external apparatus. The radar apparatus includes a detector, a controller, a first storage, and a casing. The detector includes a transmitter for transmitting radar waves, and a receiver for receiving reflected waves. A deviation amount (first error E1) of "an actual position and an actual posture" of the detector with respect to the casing from "a normal position and a normal posture" of the detector with respect to the casing is stored in the first storage included in the radar apparatus. The casing is fixed to a bracket fixed with respect to the vehicle body. At the vehicle production factory, when the casing is fixed to the vehicle body through intermediation of the bracket, a deviation amount (third error E3) of "an actual position and an actual posture" of the detector of the radar apparatus with respect to the vehicle body from "a normal position and a normal posture" of the detector of the radar apparatus with respect to the vehicle body is measured. Further, a deviation amount (second error E2) of "an actual position and an actual posture" of the casing with respect to the vehicle body from "a normal position and a normal posture" of the casing with respect to the vehicle body is obtained from the third error E3 and the first error E1 stored in the first storage included in the radar apparatus, and the deviation amount (second error E2) is stored in the second storage of the external apparatus. The controller reads out the first error E1 and the second error E2 from the first storage and the second storage, respectively, corrects data output from the detector ("distance and direction from the vehicle" of the target object around the vehicle) based on the first error E1 and the second error E2, and transmits the corrected data to the driving assistance apparatus.

Modification Example 6

The casing 11 of the image pickup apparatus 10 and the bracket BC may be shaped as illustrated in FIG. 9. In this case, the bracket BC includes adhesion portions Ad at a plurality of upper portions. The adhesion portions Ad are caused to adhere to the front windshield glass G with an adhesive so that the bracket BC is fixed to the front windshield glass G. Further, the casing 11 is mounted to the bracket BC from below, and is fixed to the bracket BC by a fixing unit (not shown).

The first error E1 includes "the error of the position of the detector 12 with respect to the casing 11 and the error of the posture of the detector 12 with respect to the casing 11" in a case in which it is assumed that the casing 11 is mounted at a normal position and in a normal posture with respect to the vehicle body B. However, the first error E1 is not only required to be a value obtained in a case in which it is assumed that the casing 11 is mounted at a normal position and in a normal posture with respect to the vehicle body B. In this case, in Step 712, the CPU may convert the first error E1 into "an error in a case in which it is assumed that the casing 11 is mounted at a normal position and in a normal posture with respect to the vehicle body B," and then may obtain the second error E2.

What is claimed is:

1. An in-vehicle sensor system, comprising:
   a surrounding sensor including:
      a casing removably mounted to a bracket fixed to a vehicle body of a vehicle;
      a detector which is supported by the casing, and is configured to output detection data representing a situation within a detection range determined through use of, as a reference, an axis extending from a predetermined point of the detector; and
      a first storage having stored therein first data corresponding to a deviation amount of an actual position and an actual posture of the detector with respect to the casing from a predetermined normal design position and a predetermined normal design posture of the detector with respect to the casing;
   a second storage which is provided separately from the surrounding sensor and is fixed to the vehicle body, and is configured to store second data corresponding to a deviation amount of an actual position and an actual posture of the casing with respect to the vehicle body from a predetermined normal design position and a predetermined normal design posture of the casing with respect to the vehicle body; and
   a corrector which is provided on one of an inner side and an outer side of the casing, and is configured to read out, when the second data is stored in the second storage, the first data and the second data from the first storage and the second storage, respectively, and to correct the detection data output from the detector based on the read-out first data and the read-out second data, to thereby generate and output data expected to be output by the detector when it is assumed that the detector is fixed at a predetermined normal design position and in a predetermined normal design posture with respect to the vehicle body.

2. The in-vehicle sensor system according to claim 1, wherein the second storage is configured to store, as the second data, data directly representing the deviation amount of the actual position and the actual posture of the casing with respect to the vehicle body from the predetermined normal design position and the predetermined normal design posture of the casing with respect to the vehicle body.

3. The in-vehicle sensor system according to claim 1, wherein the second storage is configured to store, as the second data, data of a combination of:
   third data directly representing a deviation amount of an actual position and an actual posture of the detector with respect to the vehicle body from a predetermined normal design position and a predetermined normal design posture of the detector with respect to the vehicle body; and
   first data directly representing the deviation amount of the actual position and the actual posture of the detector with respect to the casing from the predetermined normal design position and the predetermined normal design posture of the detector with respect to the casing, in a case in which the third data is obtained.

4. The in-vehicle sensor system according to any one of claims 1 to 3, wherein the second storage is an area of a part of a storage area of a storage device included in an in-vehicle component which is provided separately from the surrounding sensor.

5. A data generation method for an in-vehicle sensor system, which is applied to the in-vehicle sensor system,
   the in-vehicle sensor system including:
      a surrounding sensor including:
         a casing removably mounted to a bracket fixed to a vehicle body of a vehicle;
         a detector which is supported by the casing, and is configured to output detection data representing a situation within a detection range determined through use of, as a reference, an axis extending from a predetermined point of the detector; and
         a first storage having stored therein first data corresponding to a deviation amount of an actual position and an actual posture of the detector with respect to the casing from a predetermined normal design position and a predetermined normal design posture of the detector with respect to the casing; and
      a second storage which is provided separately from the surrounding sensor and is fixed to the vehicle body, and is configured to store second data corresponding to a deviation amount of an actual position and an actual posture of the casing with respect to the vehicle body from a predetermined normal design position and a predetermined normal design posture of the casing with respect to the vehicle body,
   the data generation method comprising a data correcting step of reading out, by a corrector which is provided on one of an inner side and an outer side of the casing, the first data and the second data from the first storage and the second storage, respectively, when the second data is stored in the second storage, and correcting, by the corrector, the detection data output from the detector based on the read-out first data and the read-out second data, to thereby generate and output data expected to be output by the detector when it is assumed that the detector is fixed at a predetermined normal design position and in a predetermined normal design posture with respect to the vehicle body.

6. The data generation method for an in-vehicle sensor system according to claim 5, further comprising:
   a first data storing step of acquiring the first data through measurement at a stage at which the detector is fixed to the casing and before the casing is fixed to the bracket, and storing the acquired first data into the first storage; and
   a second data storing step of acquiring, from the detector, detection data representing a target arranged at a predetermined position with respect to the vehicle at a stage at which the casing is fixed to the bracket and before the vehicle is shipped from a production factory of the vehicle, acquiring the second data based on the acquired detection data and the first data, and storing the acquired second data into the second storage.

* * * * *